United States Patent Office 3,024,669
Patented Mar. 13, 1962

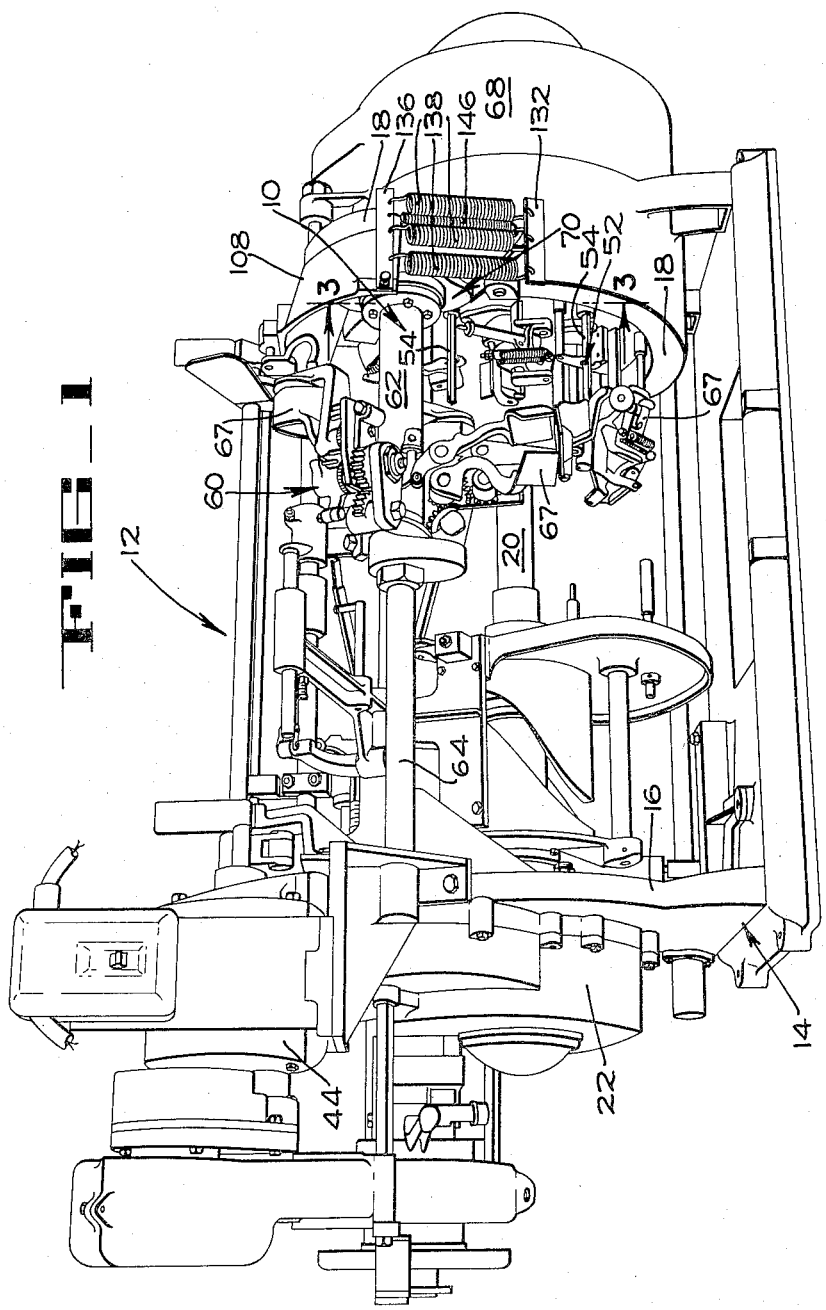

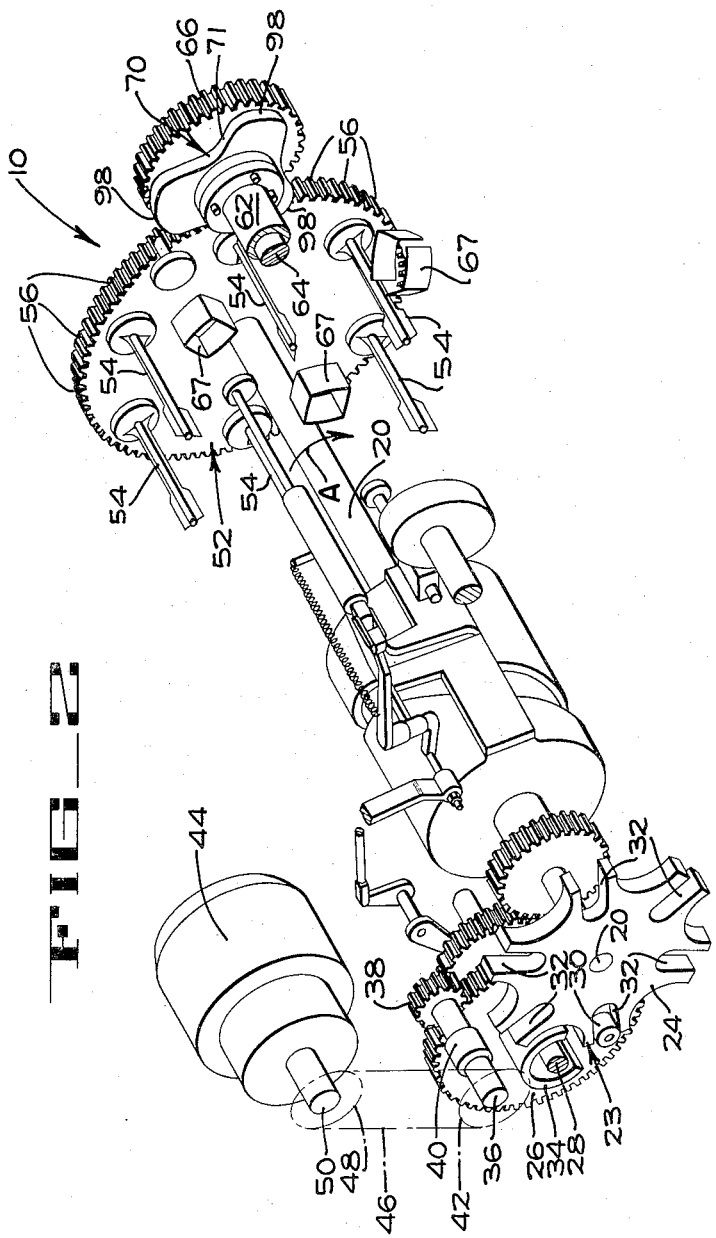

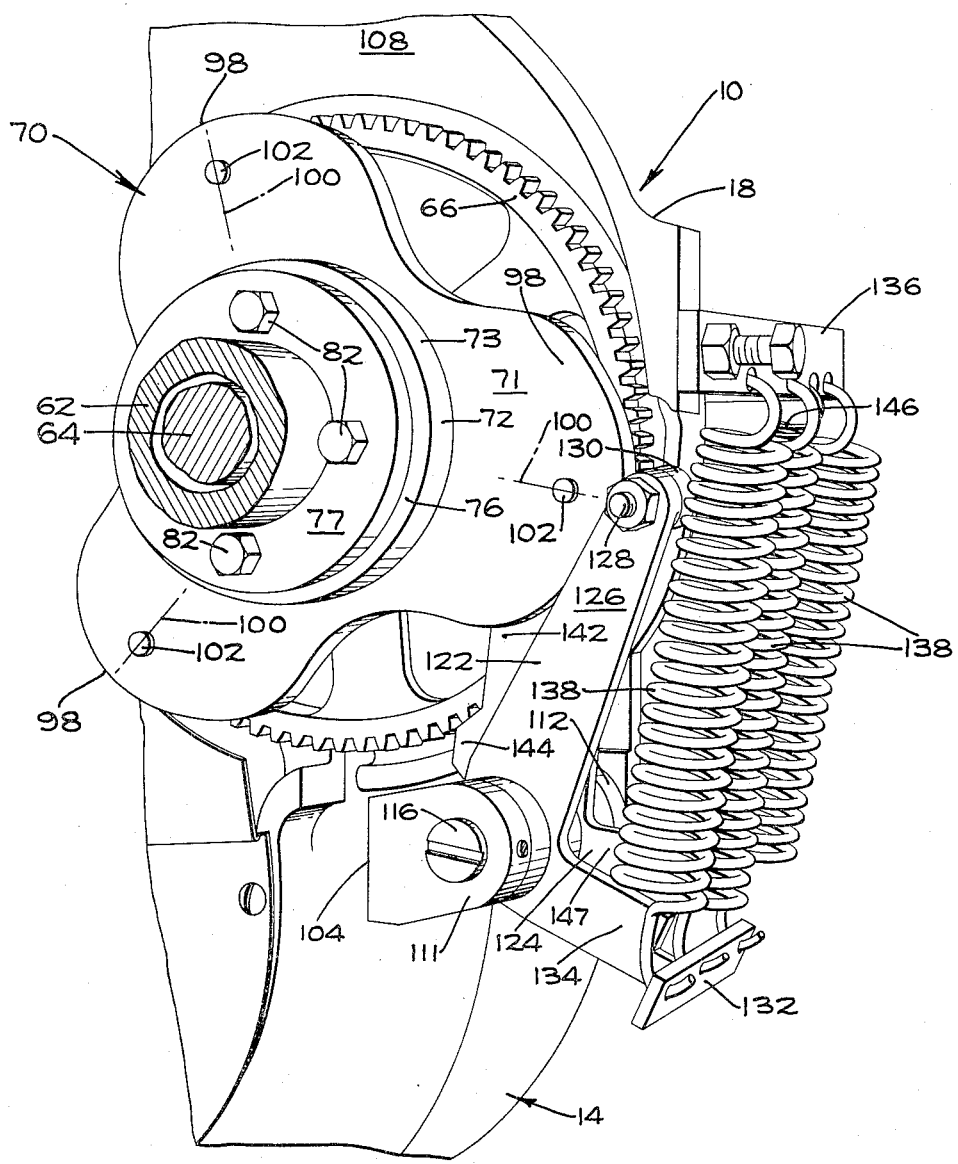

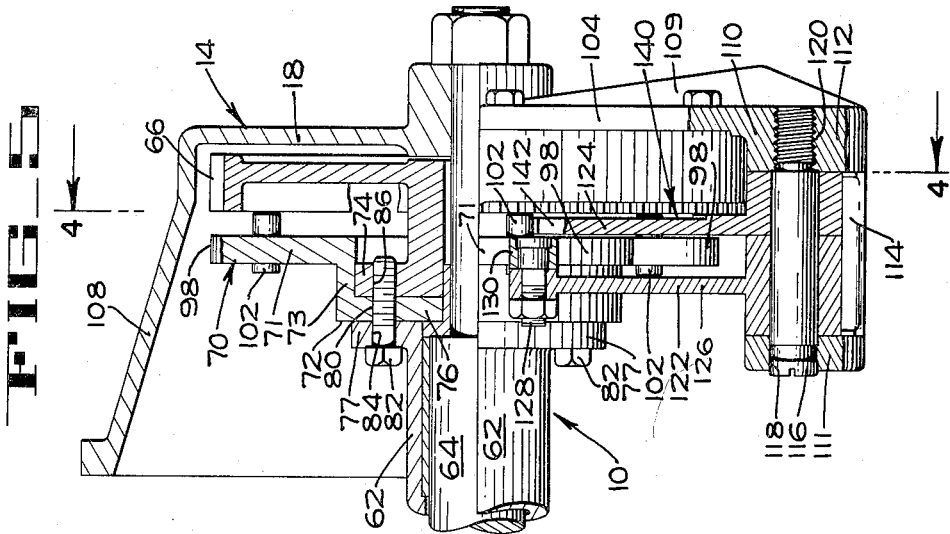
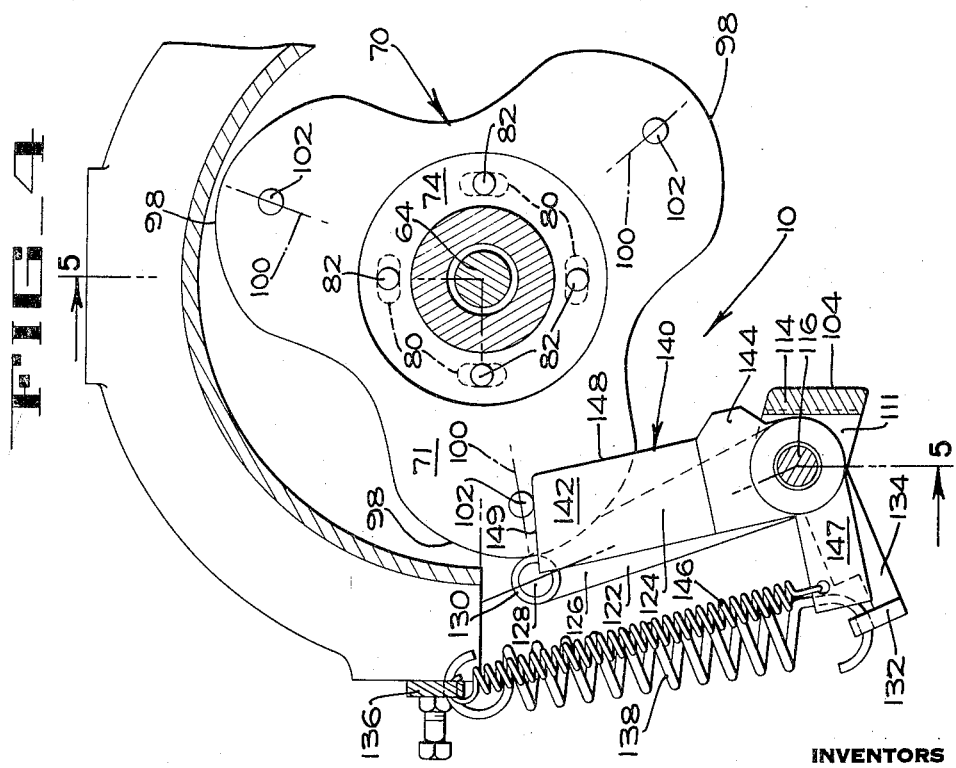

3,024,669
INTERMITTENT DRIVING MECHANISM
Sherman H. Creed, San Jose, and Gerald R. Anderson, Campbell, Calif., assignors to FMC Corporation, a corporation of Delaware
Filed May 13, 1959, Ser. No. 812,992
5 Claims. (Cl. 74—821)

The present invention appertains to driving mechanisms and more particularly relates to a driving mechanism arranged to provide a smoother operating intermittent drive for heavy parts of a fruit preparation machine or the like.

When a heavy part must be intermittently driven at high speeds through a drive train having gears or sprockets therein, there is a strong tendency for the driven part to reverse its direction of movement causing backlash in the gear or sprocket drives and also causing the different drive shafts to twist to some extent. In the case of the fruit preparation machine with which the driving mechanism of the present invention is associated, this backlash results in the misalignment of certain cooperating parts and causes considerable vibration throughout the entire machine.

It is, therefore, one object of the present invention to provide an improved intermittent driving mechanism.

Another object is to provide an inertia compensating apparatus in a driving mechanism having intermittent rotating parts, which apparatus is capable of minimizing impact resulting from starting and stopping the parts, as well as impact resulting from backlash in the driving mechanism.

Another object is to provide an apparatus for preventing backlash of an intermittently rotating part.

Another object is to provide an apparatus for assuring a gentle acceleration and thereafter a gentle deceleration of intermittently rotating parts when the same are started and thereafter stopped.

These and other objects and advantages of the present invention will become apparent from the following description and the accompanying drawings, in which:

FIG. 1 is a perspective of a pear preparation machine incorporating the improved driving mechanism of the present invention.

FIG. 2 is an enlarged diagrammatic perspective of certain drive parts of the intermittent driving mechanism used in the pear preparation machine of FIG. 1.

FIG. 3 is an enlarged perspective of the inertia compensating device taken looking in the direction of the arrows 3—3 in FIGURE 1.

FIG. 4 is a section taken along lines 4—4 of FIGURE 5.

FIG. 5 is a section taken along lines 5—5 of FIGURE 4.

Although the improved intermittent driving mechanism 10 (FIG. 1) of the present invention will be described in connection with a pear preparation machine 12, it is to be understood that the mechanism 10 can be used to intermittently drive rotative parts of other apparatus.

The pear preparation machine 12 with which the improved intermittent driving mechanism 10 is associated is of the type disclosed in the pending application for Letters Patent of Sherman H. Creed et al., Ser. No. 715,805, filed February 17, 1958 now Patent No. 2,984,274, issued May 16, 1961. In general, the pear preparation machine 12 comprises a frame 14 including vertical end walls 16 and 18. A turret drive shaft 20 extends between and is mounted for rotation in the end walls 16 and 18.

The turret drive shaft 20 projects beyond the end wall 16 into a gear chamber defined by a gear cover 22 secured to the outer face of the end wall 16. The shaft 20 is intermittently rotated in one-sixth of a revolution increments by means of a Geneva drive 23 (FIG. 2) comprising a Geneva gear 24 disposed in the gear chamber and keyed to the shaft 20. The Geneva gear 24 is actuated by a drive gear 26 keyed to a shaft 28 and carrying the usual drive roller 30 which operates in radial slots 32 in the Geneva gear 24 for rotating the same. When the drive roller 30 is out of engagement with the Geneva gear 24, the gear 24 is locked against rotation by a locking ring 34 carried by the drive gear 26. The Geneva movement is driven from a continuously rotating main drive shaft 36 by means of a pinion 38 which is keyed to the shaft 36 and is disposed in mesh with the Geneva drive gear 26. A clutch 40 of any suitable type is operatively mounted on the drive shaft 36 and a sprocket 42 is keyed on the clutch. A motor 44 is connected to the clutch 40 by a chain 46 which is trained around the sprocket 42 and around a sprocket 48 keyed to the drive shaft 50 of the motor 44. Thus, when the clutch 40 is engaged, power is transmitted from the motor 44 to the turret drive shaft 20 through the Geneva drive 23.

A turret 52, having an annularly arranged series of six stemming tubes 54 and gear teeth 56 around the periphery thereof, is keyed on the right end of the shaft 20 as viewed in FIG. 2. Pears to be processed are impaled on the stemming tubes 54 by a pear feeding mechanism 60 (FIG. 1) which is keyed to an elongated sleeve 62 journaled on a shaft 64 secured in fixed position to the end walls 16 and 18. A gear 66 (FIG. 2), in mesh with the teeth 56 of the turret 52, is journaled on the fixed shaft 64 and is connected to the sleeve 62 in a manner soon to be described.

The pear feeding mechanism 60 is of considerable mass and has three equally spaced cup assemblies 67 (FIG. 1) into which the pears are placed individually and are carried to a position of alignment with the stemming tubes 54. When the shaft 20 is intermittently rotated in the direction of the arrow A (FIG. 2) in one-sixth revolution increments by the above mentioned Geneva drive 23, the feeding mechanism 60 is rotated in one-third revolution increments in the opposite direction so that each of the cup assemblies 67 (FIG. 1) is indexed to a position of alignment with one of the stemming tubes 54 to enable other mechanism to transfer the pear from the cup to the stemming tube 54. After the pears are transferred from the feed mechanism 60 to the stemming tubes 54, the pears are carried through succeeding stations wherein the pears are peeled, split, cored, and trimmed by mechanism described in the hereinabove mentioned patent application and in Patent No. 2,139,704 to A. R. Thompson et al.

Certain other intermittently rotated structure of considerable magnitude is disposed within a housing 68 and is connected to and intermittently driven by the turret 52 (FIG. 2). This structure, which is completely disclosed in the aforementioned application, provides a large mass which also must be started and stopped each time the gear 66 is intermittently driven.

The improved intermittent driving mechanism 10 includes the above described drive parts from the motor 44 to and including an inertia compensating apparatus 70. The inertia compensating apparatus 70 (FIGS. 3, 4 and 5) comprises a clover leaf cam 71 having an annular hub 72. A cylindrical wall portion 73 of the hub 72 is slidably mounted over a flange 74 of the gear 66, and a radially extending wall 76 of the hub 72 is disposed between a flange 77 of the drive sleeve 62 and the flange 74 of the gear 66. Arcuate slots 80 (FIGS. 4 and 5) are formed in the radial wall 76, and the clover leaf cam 71 is held in adjusted position by bolts 82 which extend through the slots 80, and through holes 84 in the flange 77, and are screwed into threaded holes 86 in the flange 74. The clover leaf cam 71 has three lobes 98 (FIGS. 3 and 4) each of which is symmetrical about one of three equally spaced radially extending axes of symmetry 100. The three lobes 98 define a camming surface having ridges and valleys. An abutment pin 102 is welded to and projects outwardly from the side of each lobe 98, and each pin 102 is disposed on the axis of symmetry 100 at a point adjacent the periphery of the associated lobe 98.

A bracket 104 (FIG. 5) is bolted to the wall 18 which includes a shield 108 that surrounds the gear 66. As shown in FIGURE 5, the bracket 104 is L-shaped and has a strengthening gusset 109 formed along a leg 110 thereof. Spaced ears 111 and 112 extend outwardly from a horizontal leg 114 of the bracket 104. A pivot pin 116 is threaded at one end and is slidably received in a hole 118 in the ear 111 with the threaded end screwed and locked in a threaded hole 120 in the ear 112.

Two bell cranks 122 and 124 (FIG. 4) are received for independent pivotal movement on the pin 116. The bell crank 122 (FIG. 3) has one arm 126 which is drilled adjacent the outer end to receive a shouldered bolt 128 having a cam follower 130 journaled thereon and disposed in position to ride along the periphery of the clover leaf cam 71. The angular position of the clover leaf cam 71 relative to the cam follower 130 is such that the point of contact of the follower with the lobes 98 is along the axis 100 when the sleeve 62 and connected parts are in their indexed position. A spring connecting bracket 132 is welded to the outer end of another arm 134 of the bell crank 122 and a cooperating L-shaped bracket 136 is bolted to the stationary shield 108. Three tension springs 138 are connected between the brackets 132 and 136 and are arranged to resiliently urge the cam follower 130 against the contoured periphery of the clover leaf cam 71 with considerable force. The periphery of the cam 71 provides a contoured camming surface with the peaks of the lobes 98 defining ridges and the spaces between lobes defining valleys.

It is apparent that each intermittent movement of the sleeve 62 and parts driven thereby starts from zero velocity, is accelerated to a maximum velocity, and is then decelerated to zero velocity. The springs 138 are tensioned to their maximum extent when the intermittent rotary movement of the sleeve 62 begins, and add to the driving force by releasing energy, stored in the springs 138, as the cam follower is forced down the contacted lobe 98 to the low point between adjacent lobes 98 which is the point of maximum velocity. After the point of maximum velocity has been reached, the cam follower 130 is moved outward or up the slope of the next adjacent lobe to again store energy in the springs 138 thereby tending to retard the speed of the sleeve 62. Thus, at the beginning of each intermittent rotary movement, the springs release energy to aid the motor 44 in driving the sleeve 62, and, when the sleeve begins to decelerate, the springs 138 are stretched and absorb energy to prevent the inertia of the heavy decelerating parts connected to the sleeve 62 from tending to drive the motor 44.

As will be apparent from a study of the drive arrangement of the machine disclosed in the aforementioned Creed et al. application, there is always a torque applied to the shaft 20 in a direction opposite to the normal direction of rotation of the shaft 20 during indexing of the turret. This torque tends to reverse the direction of rotation of the Geneva gear 24 immediately after an intermittent indexing movement of the gear 24 has terminated, and before the Geneva locking ring 34 fully engages the gear 24. This reversal of movement tends to cause impacting of the members of the drive mechanism and is positively prevented by a backlash locking unit 140 (FIGS. 4 and 5).

The backlash locking unit 140 includes the bell crank 124 which cooperates with each of the pins 102 in turn. A locking arm 142 of the bell crank 124 is disposed in position to be contacted by the pins 102. A lug 144 (FIG. 4) on the arm 142 is in position to contact the leg 114 of the bracket 104 to limit the clockwise pivotal movement (FIG. 4) of the bell crank 124. A spring 146 is connected between the bracket 136 and an arm 147 of the crank 124 to normally urge the crank to pivot in a clockwise direction (FIG. 4). When the clover leaf cam 71 is driven in a clockwise direction (FIG. 4), the pins 102 will first contact a substantially vertical edge 148 of the arm 142 to cause the same to pivot counterclockwise (FIG. 4) against the urging of the spring 146. As the cam 71 reaches one of the indexed positions, the pin 102, which is mounted on the particular lobe 98 being contacted by the cam follower 130, slides off the vertical edge 148 and the spring 146 causes a substantially horizontal upper edge 149 of the arm 142 to be moved into wedging engagement under the pin 102 to positively prevent a reversal of the direction of movement of the clover leaf cam 71. Since the pin 102 and the arm 142 cooperate to prevent reverse rotation of the rather rapidly moving cam 71 and sleeve 62, it is evident that backlash of heavy parts driven by the sleeve 62 will not be transmitted past the cam 71 and hence will not affect the drive parts between the cam 71 and the motor 44.

From the foregoing description it is apparent that the improved intermittent driving mechanism of the present invention positively prevents the inertia of heavy intermittently driven rotary parts from causing backlash throughout the drive mechanism when these parts are stopped. The intermittent drive mechanism also provides means of evening the load on the motor which drives the intermittently rotating parts.

While one embodiment of the present invention has been shown and described, it will be understood that various changes and modifications may be made without departing from the spirit of the invention or the scope of the appended claims.

Having thus described the present invention and the manner in which the same is to be used, what is claimed as new and desired to protect by Letters Patent is:

1. An intermittent driving mechanism comprising an intermittently driven member mounted for rotation, a cam locked on said member to rotate therewith, a plurality of evenly spaced lobes on said cam, a pin secured to and projecting outwardly from each lobe in a direction parallel to said member, a cam follower arranged to engage said cam and follow the contour of the lobes thereon, resilient means connected to said cam follower and arranged to release stored energy to aid in driving said cam and said connected member during the first half of the intermittent movement and to retard the movement of said cam to store energy in said resilient means during the second half of said intermittent movement, a pivotally mounted locking arm having a deflecting edge and a locking edge disposed in position to be contacted by said pins, and second resilient means connected to said locking arm and arranged to urge said deflecting edge against each of said pins in turn as they are intermittently driven therepast to aid in retarding the movement of said cam during the second half of said intermittent movement and to move said locking edge into locking engagement with said pins immediately after completion of each of said intermittent movements to prevent movement of said cam in a direction opposite to that of said predetermined direction of rotation.

2. A driving mechanism for intermittently driving heavy rotating parts comprising an intermittently driven sleeve, a cam rigidly connected to said sleeve, a plurality of equally spaced lobes on said cam extending laterally outward relative to said sleeve and each lobe having a peak disposed outwardly from said sleeve a greater distance than the other portion of said lobes, a cam followe disposed in position to ride on the surface of said cam, an abutment secured to and projecting outwardly from one side of each lobe, a first bell crank pivotally mounted adjacent said cam and having a deflecting edge and a locking edge disposed in position to be engaged by said abutment, first resilient means connected to said first bell crank and arranged to urge said deflecting edge and said locking edge toward said abutments, a second bell crank pivotally mounted adjacent said cam and arranged to carry said cam follower on one end thereof, and second resilient means connected to the other end of said bell crank and arranged to resiliently urge said cam follower against said cam, said cam follower being arranged to be disposed against the peak of said lobes to store energy in said resilient means when the sleeve is not being driven, said first and second resilient means arranged to cooperate to release stored energy to aid in driving said cam and said connected member during the first half of the intermittent movement and cooperate to retard the movement of said cam to store energy in said first and second resilient means during the second half of said intermittent movement.

3. A driving mechanism for intermittently driving rotating parts comprising a rotatably mounted intermittently driven member, a cam plate rigidly secured on said member and extending transversely thereof, a lobe on the periphery of said cam plate, an abutment secured to and projecting outwardly from one side of said cam plate, a pivotally mounted locking arm having a deflecting edge and a locking edge disposed in position to contact said abutment, first resilient means connected to said locking arm for urging said locking edge against said abutment immediately before the termination of an intermittent movement to prevent reverse rotation of said member, a cam follower disposed in position to ride on the periphery of said cam plate and to lie on the peak of said lobe when the member is stopped between intermittent movements, and second resilient means connected to said cam follower for urging said follower against the periphery of said cam, said first and second resilient means cooperating to store energy therein and to resist movement of said cam plate when said lobe approaches the peak of said cam plate and cooperating to aid in accelerating said cam plate upon commencement of the next intermittent motion of said drive member by releasing energy stored in said first and second resilient means.

4. In an intermittent driving mechanism, a member mounted for rotation about its axis in successive operating cycles including a period in which said member is held stationary and a period during which said member is rotated successively through a predetermined angle with accelerating and decelerating angular velocity, means operatively contacting said member to absorb energy therefrom and counteract inertia when said member decelerates, store the energy and release it to assist said member to overcome inertia when accelerating, and spring loaded locking means disposed in force-transmitting contact with said member to absorb energy therefrom and aid in decelerating said member, said locking means having a portion movable into locking contact with said member to prevent reverse rotation of said member when stationary.

5. In an intermittent driving mechanism, a member mounted for intermittent rotation in one direction about its axis, a cam fixed to said member to rotate therewith, a projection extending from said cam parallel to the axis of rotation of said member, a cam follower adapted to follow the contour of said cam, a locking arm having a deflecting edge and a locking edge adapted to be contacted by said projection, first resilient means connected to said cam follower to compensate for inertia of said member during intermittent movement by storing energy and retarding the movement during the decelerating portion of the intermittent movement and releasing energy to assist in driving during the accelerating portion of the intermittent movement, and second resilient means connected to said locking arm arranged to urge said deflecting edge against said projection during the decelerating portion of the intermittent movement thus retarding the movement and storing energy and to move said locking edge into locking engagement with said projection after completion of the intermittent movement to prevent rotation in an opposite direction.

References Cited in the file of this patent
UNITED STATES PATENTS

| | | |
|---|---|---|
| 1,404,183 | Augustine | Jan. 24, 1922 |
| 1,748,023 | Lutz et al. | Feb. 18, 1930 |
| 1,778,459 | Markwick | Oct. 14, 1930 |
| 2,553,630 | Capetta | May 22, 1951 |
| 2,887,905 | Reynolds | May 26, 1959 |